(12) United States Patent
Kinuta et al.

(10) Patent No.: US 11,809,126 B2
(45) Date of Patent: *Nov. 7, 2023

(54) CHARGING MEMBER, CHARGING DEVICE, PROCESS CARTRIDGE, AND IMAGE FORMING APPARATUS

(71) Applicant: FUJIFILM Business Innovation Corp., Tokyo (JP)

(72) Inventors: Yasuhiko Kinuta, Kanagawa (JP); Yuki Tagawa, Kanagawa (JP); Ken Ozaki, Kanagawa (JP); Noboru Hirakawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 46 days.

This patent is subject to a terminal disclaimer.

(21) Appl. No.: 17/582,008

(22) Filed: Jan. 24, 2022

(65) Prior Publication Data

US 2023/0068161 A1 Mar. 2, 2023

(30) Foreign Application Priority Data

Aug. 20, 2021 (JP) .................................. 2021-135201

(51) Int. Cl.
| | | |
|---|---|---|
| *G03G 15/02* | (2006.01) | |
| *G03G 21/18* | (2006.01) | |
| *G03G 5/047* | (2006.01) | |
| *G03G 5/147* | (2006.01) | |
| *C08K 3/04* | (2006.01) | |
| *C08L 15/02* | (2006.01) | |
| *C08K 3/013* | (2018.01) | |

(52) U.S. Cl.
CPC ............ *G03G 21/1814* (2013.01); *C08K 3/04* (2013.01); *C08L 15/02* (2013.01); *G03G 5/047* (2013.01); *G03G 5/147* (2013.01); *C08K 3/013* (2018.01); *C08K 2201/001* (2013.01)

(58) Field of Classification Search
CPC ........... G03G 15/0216; G03G 15/0233; G03G 21/1814; C08K 3/04; C08K 3/013; C08K 2201/001; C08L 15/02
See application file for complete search history.

(56) References Cited

U.S. PATENT DOCUMENTS

| | | | | |
|---|---|---|---|---|
| 2014/0133888 A1* | 5/2014 | Ohshima | ............ | G03G 15/0233 399/176 |
| 2014/0219682 A1* | 8/2014 | Tsuto | ................. | G03G 15/0233 399/176 |
| 2023/0064838 A1* | 3/2023 | Kinuta | ............... | G03G 21/1814 |

FOREIGN PATENT DOCUMENTS

JP 2017062435 3/2017

\* cited by examiner

*Primary Examiner* — Hoang X Ngo
(74) *Attorney, Agent, or Firm* — JCIPRNET (57) ABSTRACT

A charging member includes a conductive base material; an elastic layer that is provided on the conductive base material and has a storage elastic modulus G of 5.0 MPa or less at 100 Hz; and a surface layer that is provided on the elastic layer, in which in a Cole-Cole plot obtained by measuring the charging member in a range of 1 MHz to 0.1 Hz by an alternating current impedance method, a resistance component Ra of a capacitive semicircle including 2.5 kHz is 6.3×10⁴Ω or less.

20 Claims, 3 Drawing Sheets

CHARGING MEMBER, CHARGING DEVICE, PROCESS CARTRIDGE, AND IMAGE FORMING APPARATUS

CROSS-REFERENCE TO RELATED APPLICATIONS

This application is based on and claims priority under 35 USC 119 from Japanese Patent Application No. 2021-135201 filed Aug. 20, 2021.

BACKGROUND

(i) Technical Field

The present invention relates to a charging member, a charging device, a process cartridge, and an image forming apparatus.

(ii) Related Art

JP2017-062435A discloses an image forming apparatus including: an electrophotographic photoreceptor; a charging unit that has a charging member which has a conductive support, a conductive elastic layer disposed on the conductive support, and a surface layer disposed on the conductive elastic layer and in which a product of a high frequency resistance component (Ω·m) and a high frequency capacitance (F/m) from 10 kHz to 100 Hz in a case of measurement by an alternating current impedance method in a range of 1 MHz to 1 mHz is $7.0\times10^{-6}$ (Ω·F) or more and $7.0\times10^{-5}$ (Ω·F) or less, and that charges a surface of the electrophotographic photoreceptor by a contact charging method in which only a direct current voltage is applied to the charging member; an electrostatic latent image forming member that forms an electrostatic latent image on a surface of the charged electrophotographic photoreceptor; a developing unit that develops the electrostatic latent image formed on the surface of the electrophotographic photoreceptor by a developer containing a toner to form a toner image; and a transfer unit that transfers the toner image to a surface of a recording medium.

SUMMARY

In an image forming apparatus using a charging unit using a contact charging method, a surface of an electrophotographic photoreceptor is charged by discharging in a minute gap (also referred to as a "micro gap") around a contact portion between the electrophotographic photoreceptor and the charging member. However, in a case where a load due to the discharging is large, the surface of the electrophotographic photoreceptor may deteriorate and wear of the surface of the electrophotographic photoreceptor may be promoted.

Aspects of non-limiting embodiments of the present disclosure relate to a charging member, a charging device, a process cartridge, and an image forming apparatus, the charging member including a conductive base material, an elastic layer, and a surface layer, and suppresses wear of an electrophotographic photoreceptor, compared to a case where a storage elastic modulus G of the elastic layer is more than 5.0 MPa or a case where a resistance component Ra is more than $6.3\times10^{4}$ Ω.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

As specific means, the following aspects are contained.

According to an aspect of the present disclosure, there is provided a charging member including: a conductive base material; an elastic layer that is provided on the conductive base material and has a storage elastic modulus G of 5.0 MPa or less at 100 Hz; and a surface layer that is provided on the elastic layer, in which in a Cole-Cole plot obtained by measuring the charging member in a range of 1 MHz to 0.1 Hz by an alternating current impedance method, a resistance component Ra of a capacitive semicircle including 2.5 kHz is $6.3\times10^{4}$ Ω or less.

BRIEF DESCRIPTION OF THE DRAWINGS

Exemplary embodiment(s) of the present invention will be described in detail based on the following figures, wherein.

DETAILED DESCRIPTION

Hereinafter, exemplary embodiments which are examples of the present disclosure will be described. These descriptions and examples illustrate the exemplary embodiments and do not limit the scope of the exemplary embodiments of the present disclosure.

In a numerical range described stepwise in the present specification, an upper limit value or a lower limit value described in one numerical range may be replaced with an upper limit value or a lower limit value of another numerical range described stepwise. Further, in a numerical range described in the present specification, an upper limit value or a lower limit value of the numerical range may be replaced with a value shown in examples.

In a case where the amount of each component in a composition is mentioned in the present specification and plural kinds of substances corresponding to each component are present in the composition, unless otherwise specified, the amount means a total amount of the plural kinds of substances present in the composition.

In the present specification, an "electrophotographic photoreceptor" is also simply referred to as a "photoreceptor".

In the present specification, an "axial direction" of a charging member means a direction in which a rotation axis of the charging member extends. A "circumferential direction" means a rotation direction of the charging member.

Also, in the present specification, "conductive" means that a volume resistivity at 20° C. is $1\times10^{14}$ Ωcm or less.

Charging Member

A charging member according to the present exemplary embodiment includes a conductive base material, an elastic layer that is provided on the conductive base material, and has a storage elastic modulus G of 5.0 MPa or less at 100 Hz, and a surface layer that is provided on the elastic layer.

Furthermore, in a Cole-Cole plot obtained by measuring the charging member in a range of 1 MHz to 0.1 Hz by an alternating current impedance method, a resistance component Ra of a capacitive semicircle including 2.5 kHz is $6.3 \times 10^4 \Omega$ or less.

Since the charging member according to the present exemplary embodiment has the above configuration, wear of the electrophotographic photoreceptor is suppressed. The reason is not clear, but it is presumed as follows.

In an image forming apparatus using a charging unit using a contact charging method, a surface of an electrophotographic photoreceptor is charged by discharging in a minute gap (also referred to as a "micro gap") around a contact portion between the electrophotographic photoreceptor and the charging member. In a case where a load due to the discharging is large, the surface of the electrophotographic photoreceptor is likely to deteriorate and a deterioration area is scraped off by rubbing with a cleaning blade or the like. Therefore, wear of the surface of the electrophotographic photoreceptor may be promoted. In particular, in a case where a superimposed voltage in which a direct current voltage and an alternating current voltage are superimposed is applied to the charging member, the load due to the discharging is likely to increase, and the wear of the surface of the electrophotographic photoreceptor tends to be promoted.

On the other hand, in a case where a voltage applied to the charging member is lowered, the load due to the discharging is reduced, but the voltage applied to a discharge region becomes weak and non-uniform. Accordingly, a dot-like image omission due to uneven charging may occur in an image. Therefore, for example, it is preferable that a voltage required to suppress the occurrence of the dot-like image omission is applied to the charging member.

On the other hand, in the present exemplary embodiment, the storage elastic modulus G in the elastic layer is 5.0 MPa or less, and the resistance component Ra is $6.3 \times 10^4 \Omega$ or less.

Here, the resistance component Ra is a resistance component of a capacitive semicircle including 2.5 kHz, in the Cole-Cole plot obtained by measuring the charging member in a range of 1 MHz to 0.1 Hz by an alternating current impedance method. In the Cole-Cole plot obtained by measuring the charging member having the conductive base material, the elastic layer, and the surface layer, it is considered that the capacitive semicircle including 2.5 kHz is derived from the elastic layer. Moreover, by lowering the resistance component Ra of the capacitive semicircle derived from the elastic layer, a proportion of a voltage, which is consumed by the elastic layer of the charging member, to the voltage applied to the charging member is reduced. Therefore, even in a case where the alternating current voltage applied to the charging member is reduced, the dot-like image omission is less likely to occur. That is, the alternating current voltage required to suppress the occurrence of the dot-like image omission is lowered. Therefore, by applying a low alternating current voltage to the charging member to form an image, a discharge load applied to the electrophotographic photoreceptor is reduced.

In addition, the storage elastic modulus G is a storage elastic modulus of the elastic layer at 100 Hz. In the image forming apparatus, the charging member operates at a high rotation speed of 100 Hz or higher in general. That is, the expression that the storage elastic modulus G is low means that the storage elastic modulus of the elastic layer in the charging member that operates at the high rotation speed of 100 Hz or higher is low. Moreover, it is considered that, in a case where the storage elastic modulus G is low, in a contact portion between the charging member and the electrophotographic photoreceptor, the electrophotographic photoreceptor bites into the charging member, a contact width becomes long, an angle at which the surface of the charging member separates from the electrophotographic photoreceptor becomes steep, and a width which becomes a micro gap becomes narrower. That is, a discharge width becomes narrow. Therefore, the discharge load applied to the electrophotographic photoreceptor is reduced.

As described above, it is presumed that, in the present exemplary embodiment, since the storage elastic modulus G is 5.0 MPa or less and the resistance component Ra is $6.3 \times 10^4 \Omega$ or less, the discharge load to the electrophotographic photoreceptor is reduced, therefore, the wear of the electrophotographic photoreceptor is suppressed.

Here, the resistance component Ra is obtained as follows.

In the measurement by the alternating current impedance method, SI 1260 inpedance/gain phase analyzer (manufactured by TOYO Corporation) is used as a power supply and an ammeter and 1296 dielectic interface (manufactured by TOYO Corporation) is used as a current amplifier.

An alternating current voltage of 1 Vp-p is applied from a high frequency side in a frequency range of 1 MHz to 0.1 Hz, by using the conductive base material of the charging member, which is an object of the impedance measurement, as a cathode and the outer peripheral surface of the charging member, around which an aluminum plate with a width of 1.5 cm is wound, as an anode, and an alternating current impedance of the charging member which is an object of measurement is measured. In a graph of the Cole-Cole plot obtained from the measurement, by fitting the capacitive semicircle including 2.5 kHz to an RC parallel equivalent circuit, the resistance component Ra (unit: $\Omega$) and a capacitance component Ca (unit: F) is obtained. A "time constant Tc of the capacitive semicircle including 2.5 kHz", which will be described later, is obtained by the product of the resistance component Ra and the capacitance component Ca.

In addition, the storage elastic modulus G of the elastic layer is obtained as follows.

The elastic layer is cut out from the charging member which is an object of measurement to have a length of 24 mm, a width of 2 mm, and a thickness of 0.5 mm and the storage elastic modulus thereof at 100 Hz is measured by using a dynamic viscoelastometer RHEOVIBRON (manufactured by ORIENTEC Co., LTD), under conditions of a temperature of 24° C., a distance between chucks of 20 mm, a load of 10 gf, an amplitude of 80 μm, and an automatic sweep from a frequency of 0.1 Hz to 100 Hz.

Examples of a method of controlling the resistance component Ra and the storage elastic modulus G within the above ranges include a method of controlling by adjusting a blending ratio of a component to be contained in the elastic layer, a method of controlling by changing a manufacture condition (for example, a cross-linking condition and the like) of the elastic layer.

Specifically, for example, in a case where the elastic layer contains an inorganic filler such as calcium carbonate, the resistance component Ra and the storage elastic modulus G may be controlled by adjusting a content of the inorganic filler. By lowering the content of the inorganic filler, a value of the resistance component Ra tends to decrease, and a value of the storage elastic modulus G also tends to decrease.

In addition, for example, in a case where the elastic layer contains carbon black, the resistance component Ra and the storage elastic modulus G may be controlled by adjusting the content of carbon black. By lowering the content of the carbon black, the value of the resistance component Ra tends to decrease, and the value of the storage elastic modulus G also tends to decrease.

Also, for example, in a case where the elastic layer contains an epichlorohydrin-alkylene oxide copolymer rubber, the resistance component Ra may be controlled by adjusting a polymerization ratio of the copolymer rubber. By increasing the polymerization ratio of an alkylene oxide component in the copolymer rubber, the value of the resistance component Ra tends to decrease.

Further, for example, in a case where the elastic layer is obtained through a cross-linking reaction, the resistance component Ra may be controlled by reducing the amount of a cross-linking agent, lowering a heating temperature at the time of cross-linking, shortening heating time at the time of cross-linking, and the like.

Hereinafter, details of the charging member according to the present exemplary embodiment will be described.

In a case where the charging member according to the present exemplary embodiment includes the conductive base material, the elastic layer that is formed on the conductive base material, and the surface layer that is provided on the elastic layer, a layer configuration thereof is not particularly limited, and may further include other layers. Examples of other layers include one or more adhesive layers provided between the conductive base material and the elastic layer, one or more intermediate layers provided between the elastic layer and the surface layer, and the like.

Figure 1:
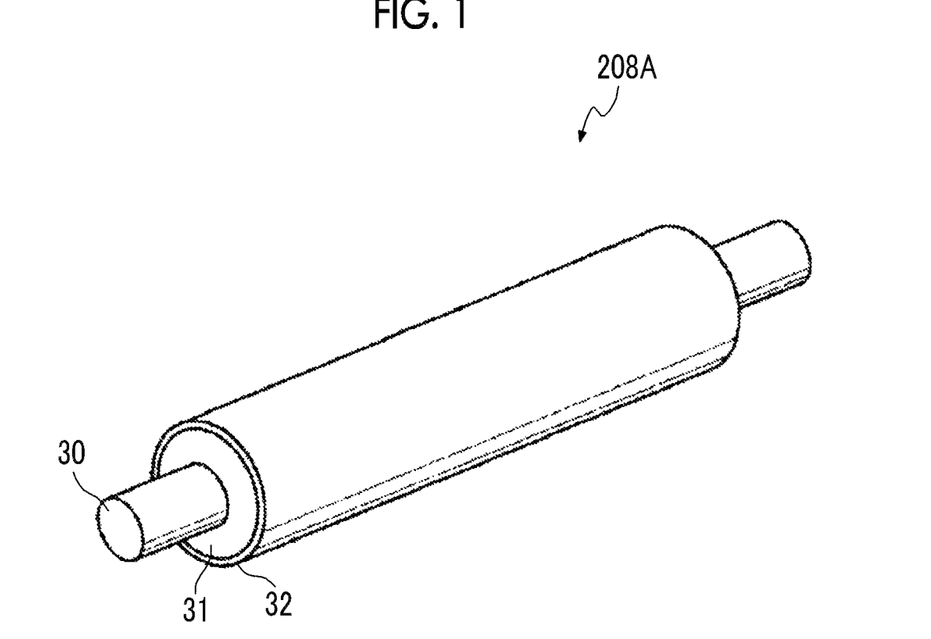
FIG. 1 is a schematic configuration diagram showing an example of a charging member according to the present exemplary embodiment.

A shape of the charging member according to the present exemplary embodiment is not particularly limited, and for example, a form of a roll-shaped charging member as illustrated in FIG. 1, that is, a so-called charging roll is preferable.

Hereinafter, the configuration will be described by taking the charging roll, which is a form of the charging member, as an example.

FIG. 1 shows an example of the charging member according to the present exemplary embodiment. A charging member 208A shown in FIG. 1 includes a conductive base material 30 which is a hollow or non-hollow cylindrical member, an elastic layer 31 that is disposed on an outer peripheral surface of the conductive base material 30, and a surface layer 32 that is disposed on an outer peripheral surface of the elastic layer 31.

Hereinafter, a configuration of the charging roll shown in FIG. 1 will be described in a large part. Reference numerals may be omitted in the following description.

Conductive Base Material

The conductive base material functions as an electrode and a support of the charging member.

As the conductive base material, for example, metals or alloys such as aluminum, a copper alloy, and stainless steel; iron plated with chromium, nickel, and the like; and base materials formed of a conductive material such as a conductive resin are used. The conductive base material in the present exemplary embodiment functions as an electrode and a support member of the charging roll. Examples of a material thereof include metals such as iron (such as free-cutting steel), copper, brass, stainless steel, aluminum, and nickel. In the present exemplary embodiment, the conductive base material is a conductive rod-shaped member. Examples of the conductive base material include a member (for example, a resin or a ceramic member) whose outer peripheral surface is plated, and a member (for example, a resin or a ceramic member) in which a conductive agent is dispersed, and the like. The conductive base material may be a hollow member (cylindrical member) or a non-hollow member.

Elastic Layer

Examples of the elastic layer include a conductive layer containing an elastic material and a conductive agent. The elastic layer may contain an inorganic filler and other additives, as needed.

The elastic layer may be a single layer or a laminated body in which plural layers are laminated. The elastic layer may be a conductive foamed elastic layer, a conductive non-foamed elastic layer, or a laminate of a conductive foamed elastic layer and a conductive non-foamed elastic layer.

Elastic Material

Examples of the elastic material include an epichlorohydrin-based rubber, polyurethane, a nitrile rubber, an isoprene rubber, a butadiene rubber, an ethylene-propylene rubber, an ethylene-propylene-diene rubber, a styrene-butadiene rubber, an acrylonitrile-butadiene rubber, a chloroprene rubber, chlorinated polyisoprene, hydrogenated polybutadiene, a butyl rubber, a silicone rubber, a fluororubber, a natural rubber, and an elastic material in which these materials are mixed. Among these elastic materials, for example, the epichlorohydrin-based rubber, the acrylonitrile-butadiene rubber, the styrene-butadiene rubber, the chloroprene rubber, the polyurethane, the silicone rubber, the nitrile rubber, the ethylene-propylene-diene rubber, and an elastic material in which these materials are mixed are preferable.

Among these elastic materials, for example, the elastic layer preferably contains at least the epichlorohydrin-based rubber, from a viewpoint of resistance uniformity.

The epichlorohydrin-based rubber is a polymer rubber containing at least a structural unit derived from epichlorohydrin (hereinafter, also referred to as "epichlorohydrin component"). Examples of the epichlorohydrin-based rubber include a homopolymer and a multiple copolymer (such as a binary copolymer, a ternary copolymer) of epichlorohydrin. Examples of the multiple copolymer include an epichlorohydrin-allyl glycidyl ether copolymer rubber, an epichlorohydrin-alkylene oxide (ethylene oxide, propylene oxide, or both thereof) copolymer rubber, and the like.

For example, the elastic layer preferably contains a polymorphic copolymer containing an epichlorohydrin component, and more preferably contains an epichlorohydrin-alkylene oxide copolymer rubber from a viewpoint that it becomes easy to control the resistance component Ra.

The epichlorohydrin-alkylene oxide copolymer rubber may contain an epichlorohydrin component and a structural unit derived from the alkylene oxide (hereinafter, also referred to as "alkylene oxide component"), and may further contain a structural unit derived from other polymerization components. Examples of other polymerization components include allyl glycidyl ether and the like. The epichlorohydrin-alkylene oxide copolymer rubber may be an epichlorohydrin-alkylene oxide rubber consisting of an epichlorohydrin component and an alkylene oxide component, and may be an epichlorohydrin-alkylene oxide-allyl glycidyl ether rubber containing an epichlorohydrin component, an alkylene oxide component, and a structural unit derived from allyl glycidyl ether.

In a case where the elastic layer contains the epichlorohydrin-alkylene oxide copolymer rubber, a content of the alkylene oxide component with respect to the entire epichlorohydrin-alkylene oxide copolymer rubber is, for example, preferably 45% by mass or more, more preferably 50% by mass or more and 70% by mass or less, and still more preferably 55% by mass or more and 65% by mass or less. In a case where the content of the alkylene oxide component is in the above range, it becomes easier to control the resistance component Ra to a lower value, compared to a case where the content is less than the above range. In addition, in a case where the content of the alkylene oxide component is in the above range, it is good that the resistance component Ra can be easily controlled to a low value and a resistance fluctuation due to an environment (temperature and humidity) is small, compared to a case where the content is more than the above range.

A proportion of the epichlorohydrin-based rubber to the entire elastic material contained in the elastic layer is, for example, preferably 80% by mass or more, more preferably 90% by mass or more, and still more preferably 95% by mass or more, from the viewpoint of resistance uniformity.

Conductive Agent

Examples of the conductive agent include an electronic conductive agent and an ionic conductive agent.

Examples of the electronic conductive agent include powders of carbon black such as furnace black, thermal black, channel black, ketjenblack, acetylene black, and color black; pyrolytic carbon; graphite; a metal or an alloy such as aluminum, copper, nickel, and stainless steel; a metal oxide such as a tin oxide, an indium oxide, a titanium oxide, a tin oxide-antimony oxide solid solution, tin oxide-indium oxide solid solution; a substance in which a surface of an insulating substance is subjected to a conduction treatment; and the like.

Examples of the ionic conductive agent include a perchlorate or a chlorate such as tetraethylammonium, laurylt-rimethylammonium, and benzyltrialkylammonium; a perchlorate or a chlorate of alkali metals such as lithium and magnesium or alkaline earth metals; and the like.

One kind of the conductive agent may be used alone, or two or more kinds thereof may be used in combination.

Among these conductive agents, for example, the elastic layer preferably contains at least carbon black from a viewpoint of formability, and preferably contains carbon black and an ionic conductive agent from the viewpoint of suppressing the resistance fluctuation due to the environment (temperature and humidity) while controlling the resistance component Ra and the storage elastic modulus G.

From viewpoints of resistance controllability and a kneading property, an arithmetic average particle diameter of the carbon black is, for example, preferably 1 nm or more and 200 nm or less, more preferably 10 nm or more and 200 nm or less, still more preferably 10 nm or more and 100 nm or less, and particularly preferably 30 nm or more and 70 nm or less.

The arithmetic average particle diameter of the carbon black is a number average particle size obtained by measuring a particle size distribution using a laser diffraction type particle size distribution measuring device (for example, LS13 320 manufactured by Beckman Coulter). In the obtained particle size distribution, a cumulative distribution is subtracted from a small particle size side of each peak for a divided particle size range (channel), and a particle size of 50% cumulative for all particles of each peak is set to the arithmetic average particle diameter of corresponding particles.

The arithmetic average particle diameter of the carbon black may be calculated using a sample obtained by cutting out an elastic layer by observing with an electron microscope, measuring diameters (maximum diameters) of 100 particles of the conductive agent, and averaging the diameters. In addition, the arithmetic average particle diameter may be measured using, for example, a Zetasizer Nano ZS manufactured by Sysmex Corporation.

In a case where the elastic layer contains the carbon black, the content of the carbon black is, for example, preferably 10 parts by mass or less, more preferably 5 parts by mass or less, and still more preferably 3 parts by mass or less, with respect to 100 parts by mass of the elastic material, from the viewpoint of controlling the resistance component Ra and the storage elastic modulus G within the above ranges. In addition, the content of the carbon black is, for example, preferably 1 part by mass or more with respect to 100 parts by mass of the elastic material from the viewpoint of formability.

The content of the carbon black is, for example, preferably 10 parts by mass or less, more preferably 1 part by mass or more and 5 parts by mass or less, and still more preferably 1 part by mass or more and 3 parts by mass or less, with respect to 100 parts by mass of the elastic material.

The ionic conductive agent contained in the elastic layer is, for example, preferably at least one compound selected from the group consisting of a quaternary ammonium salt compound, an alkali metal or an alkaline earth metal salt of perchloric acid, and an alkali metal or an alkaline earth metal salt of chloric acid, and more preferably the quaternary ammonium salt compound, from a viewpoint of long-term image quality maintenance regardless of environment.

In a case where the elastic layer contains the ionic conductive agent, a content of the ionic conductive agent is, for example, preferably 0.1 parts by mass or more and 5 parts by mass or less, more preferably 0.5 parts by mass or more and 3 parts by mass or less, and still more preferably 1 part by mass or more and 2 parts by mass or less, with respect to 100 parts by mass of the elastic material, from viewpoints of resistance controllability and bleeding suppression.

In a case where the elastic layer contains the carbon black and the ionic conductive agent, a content of the carbon black is, for example, preferably 0.1 times or more and 10 times or less the content of the ionic conductive agent, more preferably 0.3 times or more and 5 times or less, and still more preferably 0.5 times or more and 2 times or less.

Inorganic Filler

The elastic layer may contain an inorganic filler, as needed. In a case where the elastic layer contains the inorganic filler, it is good that the formability is improved.

Examples of the inorganic filler include calcium carbonate, silica, clay minerals, and the like. Among these, for example, the calcium carbonate is preferable, from the viewpoint of formability and kneadability.

A content of the inorganic filler is, for example, preferably 40 parts by mass or less, more preferably 35 parts by mass or less, and still more preferably 30 parts by mass or less, with respect to 100 parts by mass of the elastic material, from the viewpoint of controlling the resistance component Ra and the storage elastic modulus G within the above ranges. From the viewpoint of formability, the content of the inorganic filler is, for example, preferably 5 parts by mass or more, more preferably 10 parts by mass or more, and still more preferably 15 parts by mass or more, with respect to 100 parts by mass of the elastic material.

The content of the inorganic filler is, for example, preferably 5 parts by mass or more and 40 parts by mass or less, more preferably 10 parts by mass or more and 35 parts by mass or less, and still more preferably 15 parts by mass or more and 30 parts by mass or less, with respect to 100 parts by mass of the elastic material.

Other Additives

The elastic layer may contain other additives, as needed.

Examples of other additives to be blended in the elastic layer include a softeners, a plasticizer, a curing agent, a vulcanizing agent, a vulcanization accelerator, a vulcanization accelerating aid, an antioxidant, a surfactant, a coupling agent, and the like.

Characteristics of Elastic Layer

A thickness of the elastic layer is, for example, preferably 1 mm or more and 10 mm or less, and more preferably 2 mm or more and 5 mm or less.

A volume resistivity of the elastic layer is, for example, preferably $1 \times 10^3$ Ωcm or more and $1 \times 10^{14}$ Ωcm or less.

The volume resistivity of the elastic layer is a value measured by a method shown below.

A sheet-shaped measurement sample is collected from the elastic layer. A voltage adjusted so that an electric field (applied voltage/composition sheet thickness) is 1000 V/cm is applied to the measurement sample for 30 seconds by using a measuring jig (R12702A/B resistivity chamber: manufactured by Advantest Corporation) and a high resistance meter (R8340A digital high resistance/micro ammeter: manufactured by Advantest Corporation) in accordance with JIS K 6911 (1995), and then the volume resistivity is calculated from a flowing current value by using the following Equation.

Volume resistivity(Ωcm)=(19.63×Applied voltage (*V*))/(Current value(*A*)×Measurement sample thickness (cm))

The storage elastic modulus G at 100 Hz in the elastic layer is 5.0 MPa or less, and for example, from the viewpoint of suppressing the wear of the electrophotographic photoreceptor, preferably 4.0 MPa or less, and still more preferably 3.0 MPa or less. In addition, the storage elastic modulus G is, for example, preferably 1.0 MPa or more, more preferably 1.5 MPa or more, and still more preferably 2.0 MPa, from a viewpoint of forming a uniform micro gap before and after a contact portion between the photoreceptor and the charging roll. The storage elastic modulus G is, for example, preferably 1.0 MPa or more and 5.0 MPa or less, more preferably 1.5 MPa or more and 4.0 MPa or less, and still more preferably 2.0 MPa or more and 3.0 MPa or less.

Formation of Elastic Layer

Examples of a method of forming the elastic layer on the conductive base material include a method in which an elastic layer forming composition in which the elastic material and a conductive agent are mixed with an inorganic filler and other additives used as necessary, and a cylindrical conductive base material are both extruded from an extruder, a layer of the elastic layer forming composition is formed on an outer peripheral surface of the conductive base material, and then the layer of the elastic layer forming composition is heated and subjected to a cross-linking reaction to form an elastic layer; a method in which an elastic layer forming composition in which an elastic layer forming composition in which an elastic material and a conductive agent are mixed with an inorganic filler and other additives used as necessary on an outer peripheral surface of an endless belt-shaped conductive base material is extruded from an extruder, a layer of the elastic layer forming composition is formed on an outer peripheral surface of the conductive base material, and then the layer of the elastic layer forming composition is heated and subjected to a cross-linking reaction to form an elastic layer; and the like. The conductive base material may have an adhesive layer on an outer peripheral surface thereof.

In a case where the cross-linking reaction is performed in a formation of the elastic layer, a cross-linking agent, a cross-linking accelerator, and a vulcanization accelerating aid may further be applied, in addition to the elastic material, the conductive agent, and the inorganic filler and other additives used as necessary.

Generally, examples of a kind of cross-linking using a cross-linking agent include sulfur cross-linking, peroxide cross-linking, quinoid cross-linking, phenol resin cross-linking, amine cross-linking, metal oxide cross-linking, and the like, and cross-linking with a material having a double bond, for example, the cross-linking with sulfur is preferable from the viewpoint of ease of cross-linking and flexibility of a cross-linking rubber.

Examples of the cross-linking accelerator include thiazole-based, thiuram-based, sulfenamide-based, thiourea-based, dithiocarbamate-based, guanidine-based, aldehyde-ammonia-based, and a mixture thereof.

Examples of the cross-linking accelerator include a zinc oxide and the like.

Further, in a case where the cross-linking reaction is performed in the formation of the elastic layer, from the viewpoint of controlling the resistance component Ra within the above range, cross-linking conditions may be adjusted, such as reducing the amount of the cross-linking agent, lowering the heating temperature at the time of cross-linking, and shortening heating time at the time of cross-linking.

Surface Layer

Examples of the surface layer include a layer containing a binder resin. The surface layer may contain conductive particles that control the resistivity of the surface layer, particles for forming unevenness that control the unevenness of the outer peripheral surface, and other additives.

Binder Resin

Examples of the binder resin include an acrylic resin, a fluorine-modified acrylic resin, a silicone-modified acrylic resin, a cellulose resin, a polyamide resin, copolymerized nylon, a polyurethane resin, a polycarbonate resin, a polyester resin, a polyimide resin, an epoxy resin, a silicone resin, a polyvinyl alcohol resin, a polyvinyl butyral resin, a polyvinyl acetal resin, an ethylene tetrafluoroethylene resin, a melamine resin, a polyethylene resin, a polyvinyl resin, a polyarylate resin, a polythiophene resin, a polyethylene terephthalate resin (PET), and fluororesin (such as a polyvinylidene fluoride resin, a tetrafluoroethylene resin, a tetrafluoroethylene-perfluoroalkyl vinyl ether copolymer (PFA), and a tetrafluoroethylene-hexafluoropropylene copolymer (FEP)). In addition, examples of the binder resin include a curable resin cured or crosslinked with a curing agent or a catalyst. Also, the binder resin may be an elastic material.

The binder resin may be used alone or two or more kinds thereof may be used by being mixed or copolymerized. In a case where the binder resin is a crosslinkable resin, the crosslinkable resin may be crosslinked and used.

Here, the copolymerized nylon is a copolymer containing any one or more of 610 nylon, 11 nylon, and 12 nylon, as a polymerization unit. The copolymerized nylon may contain other polymerization units such as 6 nylon and 66 nylon.

Among these, from a viewpoint of durability, the binder resin is, for example, preferably a polyvinylidene fluoride resin, an ethylene tetrafluoride resin, or a polyamide resin, and more preferably polyamide resin. The polyamide resin is less likely to cause triboelectric charging due to contact with a charged body (for example, an image holder), and adhesion of toner or an external additive is likely to be suppressed.

Examples of the polyamide resin include the polyamide resins described in the Polyamide Resin Handbook (Osamu Fukumoto, Nikkan Kogyo Shimbun). Among these, in particular, as the polyamide resin, for example, alcohol-soluble polyamide is preferable, alkoxymethylated polyamide (alkoxymethylated nylon) is more preferable, and methoxymethylated polyamide (methoxymethylated nylon) is still more preferable, from the viewpoint of suppressing contamination of the surface layer and suppressing uneven charging.

The number average molecular weight of the binder resin (a polymer material) is, for example, preferably in the range of 1,000 or more and 100,000 or less, and more preferably in the range of 10,000 or more and 50,000 or less.

Conductive Particle

Examples of the conductive particles contained in the surface layer include particles having a particle size of 3 μm or less and a volume resistivity of $10^9$ Ωcm or less, and specifically include particles consisting of metal oxides such as a tin oxide, a titanium oxide, and a zinc oxide or an alloy thereof, carbon black, or the like. Among these, for example, the carbon black is preferable as the conductive particles from the viewpoint of resistance controllability. One kind of the conductive particles may be used alone, or two or more kinds thereof may be used in combination.

In a case where the surface layer contains the conductive particles, examples of a content of the conductive particles include a range of 3 parts by mass or more and 25 parts by mass or less, with respect to 100 parts by mass of the binder resin. From the viewpoint of controlling the "resistance value Rd obtained by measuring the charging member by the direct current method" which will be described later, the content of the conductive particles is, for example, preferably 5 parts by mass or more and 20 parts by mass or less, and more preferably 10 parts by mass or more and 15 parts by mass or less.

Particles for Forming Unevenness

The material of the particles for forming unevenness contained in the surface layer is not particularly limited, and may be inorganic particles or organic particles.

Specific examples of the particles for forming unevenness contained in the surface layer include inorganic particles such as silica particles, alumina particles, and zircon (Zr-SiO$_4$) particles, and resin particles such as polyamide particles, fluororesin particles, and silicone resin particles.

Among these, for example, the particles for forming unevenness contained in the surface layer are more preferably resin particles and still more preferably polyamide particles, from the viewpoint of dispersibility and durability.

One kind alone or two or more kinds of the particles for forming unevenness may be contained in the surface layer.

In a case where the surface layer contains the particles for forming unevenness, from the viewpoint of controlling the "ten-point average roughness Rz on the outer peripheral surface of the charging member" and the "average spacing Sm of the unevenness on the outer peripheral surface of the charging member" which will be described later, as the particles for forming unevenness, for example, the particles for forming unevenness having a volume average particle diameter of 5 μm or more and 20 μm or less are preferably contained in an amount of 5 parts by mass or more and 30 parts by mass or less with respect to 100 parts by mass of the binder resin. Further, for example, the particles for forming unevenness having a volume average particle diameter of 5 μm or more and 10 μm or less are more preferably contained in an amount of 8 parts by mass or more and 20 parts by mass or less with respect to 100 parts by mass of the binder resin.

Regarding a method of measuring the volume average particle diameter of the particles for forming unevenness, the volume average particle diameter is calculated by observing with an electron microscope using a sample from which the layer has been cut out, measuring the diameters (maximum diameters) of 100 particles, and averaging the diameters. Further, the average particle diameter may be measured using, for example, a Zetasizer Nano ZS manufactured by Sysmex Corporation.

Other Additives

The surface layer may contain other additives. Examples of other additives include well-known additives such as a curing agent, a vulcanizing agent, a vulcanization accelerator, an antioxidant, a dispersant, a surfactant, and a coupling agent.

Characteristics of Surface Layer

The thickness of the surface layer is, for example, preferably 1 μm or more and 20 μm or less, more preferably 3 μm or more and 15 μm or less, and still more preferably 5 μm or more and 13 μm or less.

In a case where the thickness of the surface layer is not uniform (for example, in a case where the outer peripheral surface of the surface layer has unevenness), the thickness means a thickness of a recessed portion of the unevenness, that is, a binder resin portion containing no particles for forming unevenness.

A volume resistivity of the surface layer is, for example, preferably $1 \times 10^3$ Ωcm or more and $1 \times 10^8$ Ωcm or less.

Formation of Surface Layer

The surface layer is formed by dispersing or dissolving the above-mentioned components in a solvent to prepare a coating liquid, applying the coating liquid on the elastic layer prepared in advance, and drying the surface layer. Examples of a method of applying the coating liquid include a roll coating method, a blade coating method, a wire bar coating method, a spray coating method, a dip coating method, a bead coating method, an air knife coating method, a curtain coating method, and the like.

The solvent used for the coating liquid is not particularly limited, and general solvents are used. For example, alcohols such as methanol, ethanol, propanol, and butanol; ketones such as acetone and methyl ethyl ketone; tetrahydrofuran; ethers such as diethyl ether, dioxane may be used.

In a case where the surface layer contains the conductive particles, from the viewpoint of controlling the "resistance value Rd obtained by measuring the charging member by the direct current method" which will be described later, for example, it is preferable that a dipping method is used as the method of applying the coating liquid and a dispersed state of the conductive particles is adjusted by changing a solvent volatilization rate according to a dew point at the time of air drying immediately after coating, a wind speed setting, and the like.

Adhesive Layer

The charging member according to the present exemplary embodiment may have an adhesive layer between the conductive base material and the elastic layer.

Examples of the adhesive layer interposed between the elastic layer and the conductive base material include a resin layer. Specific examples thereof include resin layers of polyolefin, an acrylic resin, an epoxy resin, polyurethane, a nitrile rubber, a chlorine rubber, a vinyl chloride resin, a vinyl acetate resin, polyester, phenol resin, and a silicone resin. The adhesive layer may contain a conductive agent (for example, the above-mentioned electronic conductive agent or the ionic conductive agent).

From the viewpoint of adhesion, a thickness of the adhesive layer is, for example, preferably 1 μm or more and 100 μm or less, more preferably 2 μm or more and 50 μm or less, and particularly preferably 5 μm or more and 20 μm or less.

Characteristics of Charging Member

In the Cole-Cole plot obtained by measuring the charging member by the alternating current impedance method, the resistance component Ra of the capacitive semicircle including 2.5 kHz is $6.3 \times 10^4 \Omega$ or less, and from the viewpoint of suppressing the wear of the electrophotographic photoreceptor, is for example, preferably $5.0 \times 10^4 \Omega$ or less and more preferably $4.0 \times 10^4 \Omega$ or less. From a viewpoint of suppressing a decrease in chargeability due to current flowing at the contact portion between the charging roll and the photoreceptor, the resistance component Ra is, for example, preferably $1.0 \times 10^4 \Omega$ or more, more preferably $1.5 \times 10^4 \Omega$ or more, and still more preferably $2.0 \times 10^4 \Omega$ or more.

Examples of the capacitance component Ca of the capacitive semicircle including 2.5 kHz include a range of $1 \times 10^{-12}$ F or more and $1 \times 10^{-9}$ F or less, and from the viewpoint of chargeability, preferably $1 \times 10^{-11}$ F or more and $1 \times 10^{-10}$ F or less, and more preferably $2 \times 10^{-11}$ F or more and $8.0 \times 10^{-11}$ F or less. In a case where the capacitance component Ca is in the above range, the alternating current voltage required to suppress the occurrence of dot-like image omission becomes lower, compared to a case where the capacitance component Ca is larger than the above range, and in a case where the discharge load applied to the electrophotographic photoreceptor is reduced, the wear of the electrophotographic photoreceptor is suppressed. Further, in a case where the capacitance component Ca is in the above range, it is good to suppress that a current flows at the contact portion between the charging roll and the photoreceptor and the chargeability is lowered, compared to a case where the capacitance component Ca is smaller than the above range.

As a method of setting the capacitance component Ca in the above range, for example, a method of adjusting the blending amount of carbon black, an inorganic filler, an ionic conductive agent, a plasticizer, a cross-linking agent, and the like of the elastic layer, a method of adjusting a cross-linking temperature, and a cross-linking time, and the like.

From the viewpoint of suppressing the wear of the electrophotographic photoreceptor, the time constant Tc of the capacitive semicircle including 2.5 kHz is, for example, preferably $5.5 \times 10^{-6}$ sec or less, more preferably $5.0 \times 10^{-6}$ sec or less, still more preferably $4.0 \times 10^{-6}$ sec or less, and particularly preferably $3.0 \times 10^{-6}$ sec or less. From the viewpoint of suppressing decrease in chargeability due to a current flowing at the contact portion between the charging roll and the photoreceptor, the time constant Tc is, for example, preferably $0.1 \times 10^{-6}$ sec or more, more preferably $0.4 \times 10^{-6}$ sec or more, still more preferably $0.7 \times 10^{-6}$ sec or more, and particularly preferably $1.0 \times 10^{-6}$ sec or more.

The time constant Tc of the capacitive semicircle including 2.5 kHz is, for example, preferably $0.1 \times 10^{-6}$ sec or more and $5.5 \times 10^{-6}$ sec or less, more preferably $0.4 \times 10^{-6}$ sec or more and $5.0 \times 10^{-6}$ sec or less, still more preferably $0.7 \times 10^{-6}$ sec or more and $4.0 \times 10^{-6}$ sec or less, and particularly preferably $1.0 \times 10^{-6}$ sec or more and $3.0 \times 10^{-6}$ sec or less.

The resistance value Rd obtained by measuring the charging member by the direct current method is, for example, preferably $4.0 \times 10^6 \Omega$ or more and $3.0 \times 10^7 \Omega$ or less, more preferably $4.5 \times 10^6 \Omega$ or more and $2.5 \times 10^7 \Omega$ or less, and still more preferably $5.0 \times 10^6 \Omega$ or more and $2.0 \times 10^7 \Omega$ or less.

In a case where the resistance value Rd is in the above range, an image in which an occurrence of a color spot due to foreign matter is suppressed can be obtained compared to a case where the resistance value is lower than the above range. The occurrence of the color spot due to the foreign matter is particularly remarkable in a case where an electrophotographic photoreceptor having an organic compound layer as the outermost layer is used. It is considered that the occurrence of the color spot due to the foreign matter is caused by reduction in a charging potential in the vicinity of the foreign matter, for example, because in a case where the image is formed in a state where the foreign matter pierces in the surface of the electrophotographic photoreceptor, a current leaks through the foreign matter at the contact portion between the photoreceptor and the charging roll. Therefore, it is presumed that the color spot is suppressed by setting the resistance value Rd in the above range.

Further, in a case where the resistance value Rd is in the above range, the wear of the electrophotographic photoreceptor is suppressed compared to a case where the resistance value is higher than the above range.

Here, the resistance value Rd is obtained as follows.

In an environment with a temperature of 22° C. and a humidity of 55% RH, an electrode consisting of a cylindrical SUS bearing having a width of 5 mm is brought into contact with the surface of the charging member with a weight of 25 g, and the resistance between the electrode and the conductive base material is measured while rotating the charging member at 5.5 rpm. The applied voltage is 100 V, and the resistance value (R) is calculated by Equation of "R=V/I". This measurement and calculation are performed every 6 degrees in the circumferential direction at each of the three points 20 mm inside and the center portion from both end portions of the elastic layer, and the average value of all the measured values is taken as the resistance value Rd of the charging member.

Also, examples of a method of controlling the resistance value Rd within the above ranges include a method of controlling by adjusting a blending ratio of a component to be contained in the surface layer, a method of controlling by changing a manufacture condition (for example, a drying condition and the like) of the surface layer.

Specifically, for example, in a case where the surface layer contains conductive particles, the resistance value Rd may be controlled by adjusting the content of the conductive particles. By lowering the content of the conductive particles, the resistance value Rd tends to increase.

Further, for example, in a case where the surface layer is obtained through a drying step, a dispersed state of the conductive particles may be adjusted and the resistance value Rd may be controlled by changing a solvent volatilization rate according to a dew point at the time of air drying immediately after coating or a wind speed setting.

A ratio Rd/Ra of the resistance value Rd to the resistance component Ra is, for example, preferably 63 or more, more preferably 100 or more, and still more preferably 150 or more, from the viewpoint of achieving both suppression of the color spot due to the foreign matter and suppression of the wear of the electrophotographic photoreceptor. An upper limit of the ratio Rd/Ra is not particularly limited, and examples thereof include 225.

The ten-point average roughness Rz on the outer peripheral surface of the charging member is, for example, preferably 8 μm or less, more preferably 6 μm or less, and still more preferably 5 μm or less. In a case where the ten-point average roughness Rz is 8 μm or less, the discharge load applied to the electrophotographic photoreceptor is reduced, and the wear of the electrophotographic photoreceptor is suppressed, compared to a case where the ten-point average roughness Rz is more than 8 μm.

In addition, the ten-point average roughness Rz is, for example, preferably 2 μm or more and 8 μm or less, more preferably 4 μm or more and 7.5 μm or less, and still more preferably 4 μm or more and 7 μm or less, from a viewpoint of suppressing contamination of the charging member. In a case where the ten-point average roughness Rz is in the above range, foreign matter such as an external additive is less likely to adhere to the outer peripheral surface of the charging member and contamination of the charging member is suppressed, compared to a case where the ten-point average roughness Rz is less than the above range. Further, in a case where the ten-point average roughness Rz is in the above range, the foreign matter is likely to be removed by, for example, a charging member cleaning member after the foreign matter adheres to the outer peripheral surface of the charging member, and the contamination of the charging members is suppressed, compared to the case where ten-point average roughness Rz is more than the above range.

The average spacing Sm of the unevenness of the outer peripheral surface of the charging member is, for example, preferably 50 μm or more and 250 μm or less, more preferably 80 μm or more and 200 μm or less, and still more preferably 100 μm or more and 180 μm or less, from the viewpoint of suppressing contamination of the charging member. In a case where the average spacing Sm of the unevenness is in the above range, foreign matter such as an external additive is less likely to adhere to the outer peripheral surface of the charging member and contamination of the charging member is suppressed, compared to a case where the average spacing Sm is more than the above range. In addition, in a case where the average spacing Sm of the unevenness is in the above range, foreign matter is likely to be removed after the foreign matter such as an external additive adheres to the outer peripheral surface of the charging member and contamination of the charging member is suppressed, compared to a case where the average spacing Sm is less than the above range.

The ratio Sm/Rz of the average spacing Sm of the unevenness to the ten-point average roughness Rz is, for example, preferably 10 or more and 50 or less, more preferably 15 or more and 35 or less, and still more preferably 20 or more and 30 or less, from the viewpoint of suppressing contamination of the charging member. In a case where the ratio Sm/Rz is in the above range, foreign matter such as an external additive is less likely to adhere to the outer peripheral surface of the charging member and contamination of the charging member is suppressed, compared to a case where the average spacing Sm is more than the above range. In addition, in a case where the ratio Sm/Rz is in the above range, foreign matter is likely to be removed after the foreign matter such as an external additive adheres to the outer peripheral surface of the charging member and contamination of the charging member is suppressed, compared to a case where the ratio Sm/Rz is less than the above range.

Here, the ten-point average roughness Rz is measured in accordance with JIS B 0601: 1994. The ten-point average roughness Rz is measured using a contact-type surface roughness measuring device (SURFCOM 570A, manufactured by Tokyo Seimitsu Co., Ltd.) in an environment of 23° C. and 55% RH. The evaluation length is 4.0 mm, the reference length is 0.8 μm, the cutoff value is 0.8 mm, and a contact needle having a diamond (5 μmR, 90° cone) at the tip is used for measurement. An average value thereof is calculated. An average value of values obtained by measuring a 20 mm inside from the each of both ends of the elastic layer of the charging member and a center portion thereof, along an axial direction of the charging member is defined as the ten-point average roughness Rz.

Further, the average spacing Sm of the unevenness is measured in accordance with JIS B 0601: 1994. The average spacing Sm of the unevenness is a sum of lengths of average lines corresponding to one peak and one valley adjacent thereto in an extracted portion by extracting the reference length from the roughness curve in a direction of the average line, and the arithmetic average value of spacings of the large number of unevennesses is expressed in micrometers (μm). The average spacing Sm of the unevenness is measured using a contact-type surface roughness measuring device (SURFCOM 570A, manufactured by Tokyo Seimitsu Co., Ltd.) in an environment of 23° C. and 55% RH. The evaluation length is 4.0 mm, the reference length is 0.8 μm, the cutoff value is 0.8 mm, and a contact needle having a diamond (5 μmR, 90° cone) at the tip is used for measurement. An average value thereof is calculated. An average value of values obtained by measuring a 20 mm inside from the each of both ends of the elastic layer of the charging member and a center portion thereof, along an axial direction of the charging member is defined as the average spacing Sm of the unevenness.

Examples of a method of controlling the ten-point average roughness Rz, the average spacing Sm of the unevenness, and the ratio Sm/Rz within the above ranges include a method of controlling by adjusting a kind, a volume average particle diameter, and a content of the particles for forming unevenness by adding the particles for forming unevenness to the surface layer.

Charging Device, Image Forming Apparatus, And Process Cartridge

The charging device according to the present exemplary embodiment is a charging device that includes the above-mentioned charging member and charges the electrophotographic photoreceptor by a contact charging method.

The image forming apparatus according to the present exemplary embodiment is not particularly limited as long as the apparatus includes the charging device according to the present exemplary embodiment, and includes the electrophotographic photoreceptor and a charging device that includes the above-mentioned charging member and charges the electrophotographic photoreceptor by the contact charging method. That is, the image forming apparatus according to the present exemplary embodiment includes an electrophotographic photoreceptor, a charging device that includes the above-mentioned charging member and charges the electrophotographic photoreceptor by the contact charging method, an electrostatic latent image forming device (an example of the electrostatic latent image forming unit) that forms an electrostatic latent image on the charged surface of the electrophotographic photoreceptor, a developing device (an example of a developing unit) that develops a latent image formed on the surface of the electrophotographic photoreceptor by a developer containing a toner to form a toner image forming apparatus on the surface of the electrophotographic photoreceptor, and a transfer device (an example of transfer device) that transfers the toner image formed on the surface of the electrophotographic photoreceptor to a surface of the recording medium.

The charging device according to the present exemplary embodiment may be a charging device further including a charging member cleaning member that cleans the outer peripheral surface of the charging member.

The charging device applied to the image forming apparatus according to the present exemplary embodiment may adopt a method of applying only a direct current voltage (DC charging method), a method of applying only an alternating current voltage to the charging member (AC charging method), and a method of applying a voltage in which an alternating current voltage is superimposed on a direct current voltage to the charging member (AC/DC charging method). Further, the charging device according to the present exemplary embodiment may be a charging device further including an application unit that applies only a direct current voltage to the charging member, a charging device further including an application unit that applies only an alternating current voltage to the charging member, and a charging device further including an application unit that applies a superimposed voltage, in which a direct current voltage and an alternating current voltage are superimposed, to the charging member.

In a case where the charging device is a device that applies the alternating current voltage (that is, an AC charging method and an AC/DC charging method), the alternating current voltage is applied to the photoreceptor. Therefore, compared to a DC charging method, the amount of discharge increases. Therefore, a charging device that applies the alternating current voltage, especially the AC/DC charging method, tends to cause the wear on the surface of the photoreceptor. On the other hand, the above-mentioned charging member reduces the discharge load and suppresses the wear of the surface of the electrophotographic photoreceptor as described above. Therefore, regardless of whether the charging device is a direct charging type charging device in which an alternating current voltage is applied or an AC/DC charging type charging device, the wear of the surface of the electrophotographic photoreceptor is easily suppressed by applying the above-mentioned charging member.

Further, the wear of the surface of the electrophotographic photoreceptor is remarkable in the electrophotographic photoreceptor having the organic compound layer as the outermost layer (for example, an organic photoreceptor or the like provided with a conductive base material such as aluminum and a photosensitive layer that is provided on the conductive base material and contains a known material such as a binder resin, a charge generating material, and a charge transporting material), but even in a case where the electrophotographic photoreceptor is the organic photoreceptor, the wear of the surface of the electrophotographic photoreceptor is easily suppressed by applying the above-mentioned charging member.

The image forming apparatus according to the present exemplary embodiment may further include at least one selected form the group consisting of a fixing device that fixes a toner image on a recording medium; a cleaning device that cleans the surface of a photoreceptor after transfer of the toner image and before being charged; and a static elimination device that irradiates the surface of the photoreceptor after transfer of the toner image and before being charged, with light to eliminate static electricity.

The image forming apparatus according to the present exemplary embodiment may be any of a direct transfer type apparatus that directly transfers a toner image formed on the surface of the electrophotographic photoreceptor to a recording medium, and an intermediate transfer type device that primary transfers the toner image formed on the surface of the electrophotographic photoreceptor to the surface of an intermediate transfer body, and secondarily transfers the toner image transferred to the surface of the intermediate transfer body to the surface of the recording medium.

A process cartridge according to the present exemplary embodiment is a cartridge that is attached to and detached from the image forming apparatus, and includes a charging device that includes the above-mentioned charging member and charges the electrophotographic photoreceptor by a contact charging method. That is, the process cartridge according to the present exemplary embodiment is a process cartridge that includes an electrophotographic photoreceptor and the charging device which includes that above-mentioned charging member and charges the electrophotographic photoreceptor by a contact charging method, and that is attached to and detached from an image forming apparatus.

The process cartridge according to the present exemplary embodiment may further include at least one device selected from a developing device, a photoreceptor cleaning device, a photoreceptor static elimination device, a transfer device, and the like.

Hereinafter, configurations of the charging device, the image forming apparatus, and the process cartridge according to the present exemplary embodiment will be described with reference to the drawings.

Figure 2:
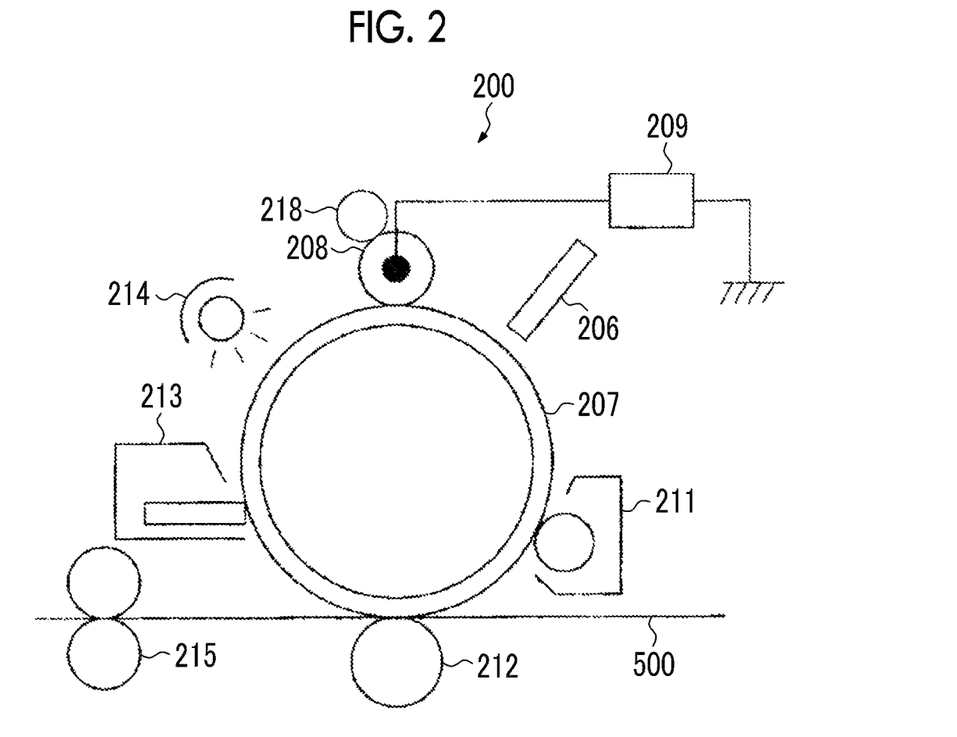
FIG. 2 is a schematic configuration diagram showing an example of an image forming apparatus according to the present exemplary embodiment.
Figure 3:
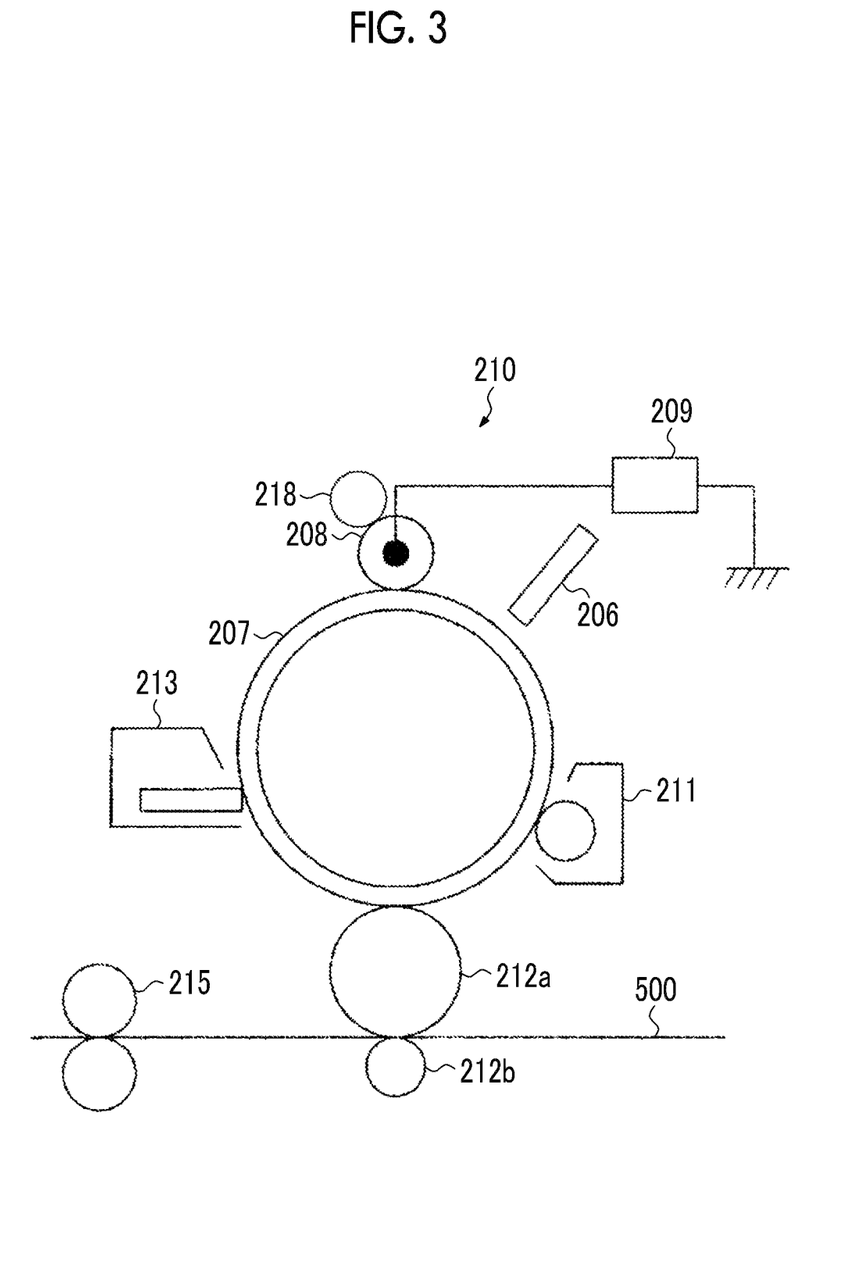
FIG. 3 is a schematic configuration diagram showing another example of the image forming apparatus according to the present exemplary embodiment.

FIG. 2 is a schematic configuration diagram showing an example of an image forming apparatus according to the present exemplary embodiment. FIG. 2 is a schematic diagram showing a direct transfer type image forming apparatus. FIG. 3 is a schematic configuration diagram showing another example of the image forming apparatus according to the present exemplary embodiment. FIG. 3 is a schematic diagram showing an intermediate transfer type image forming apparatus.

An image forming apparatus 200 shown in FIG. 2 includes an electrophotographic photoreceptor (also simply referred to as a "photoreceptor") 207, a charging member 208 that charges a surface of the photoreceptor 207, a power supply 209 (an example of an application unit) that is connected to the charging member 208, a charging member cleaning member 218 that cleans the outer peripheral surface of the charging member 208, an exposure device 206 that exposes the surface of the photoreceptor 207 to form a latent image, a developing device 211 that develops the latent image on the photoreceptor 207 by a developer containing a toner, a transfer device 212 that transfers the toner image formed on the photoreceptor 207 to a recording medium 500, a fixing device 215 that fixes the toner image to the recording medium 500, a cleaning device 213 that removes toner remaining on the photoreceptor 207, and static elimination device 214 that eliminates static electricity of the surface of the photoreceptor 207. The static elimination device 214 may not be provided. In the image forming apparatus 200, the charging device is configured of the charging member 208, the power supply 209, and the charging member cleaning member 218.

An image forming apparatus 210 shown in FIG. 3 includes a photoreceptor 207, a charging member 208, a power supply 209, a charging member cleaning member 218, an exposure device 206, a developing device 211, and a primary transfer member 212a and a secondary transfer member 212b which transfer the toner image formed on the photoreceptor 207 to the recording medium 500, a fixing device 215, and a cleaning device 213. The image forming apparatus 210 may include a static elimination device as in the image forming apparatus 200. In the image forming apparatus 210, the charging device is configured of the charging member 208, the power supply 209, and the charging member cleaning member 218.

The charging member 208 is a contact charging type charging member that is consisting of made of a roll-shaped charging member and in contact with the surface of the photoreceptor 207 to charge the surface of the photoreceptor 207. A voltage of only the direct current voltage, only the alternating current voltage, or a voltage obtained by superimposing the alternating current voltage on the direct current voltage is applied to the charging member 208 from the power supply 209.

Further, the surface of the charging member 208 is cleaned by the charging member cleaning member 218. Examples of the charging member cleaning member 218 include a roll, a blade, a brush, and the like. Examples of the roll-shaped charging member cleaning member include a charging member cleaning roll including a core body and an elastic layer provided on the outer peripheral surface of the core body.

Examples of the exposure device 206 include an optical system apparatus including a light source such as a semiconductor laser and a light emitting diode (LED).

The developing device 211 is a device that supplies a toner to the photoreceptor 207. The developing device 211 forms the toner image by, for example, bringing a roll-shaped developer holder in contact with or close to the photoreceptor 207 and adheres the toner to the latent image on the photoreceptor 207.

Examples of the transfer device 212 include a conductive roll that presses against the photoreceptor 207 via a corona discharge generator and a recording medium 500.

Examples of the primary transfer member 212a include a conductive roll that rotates in contact with the photoreceptor 207. Examples of the secondary transfer member 212b include a conductive roll that presses against the primary transfer member 212a via the recording medium 500.

Examples of the fixing device 215 include a heating fixing device including a heating roll and a pressure roll that presses against the heating roll.

Examples of the cleaning device 213 include a device provided with a blade, a brush, a roll, and the like as a cleaning member. Examples of the material of the cleaning blade include a urethane rubber, a neoprene rubber, and a silicone rubber.

The static elimination device 214 is, for example, a device that irradiates the surface of the photoreceptor 207 after transfer with light to eliminate a residual potential of the photoreceptor 207. The static elimination device 214 may not be provided.

Figure 4:
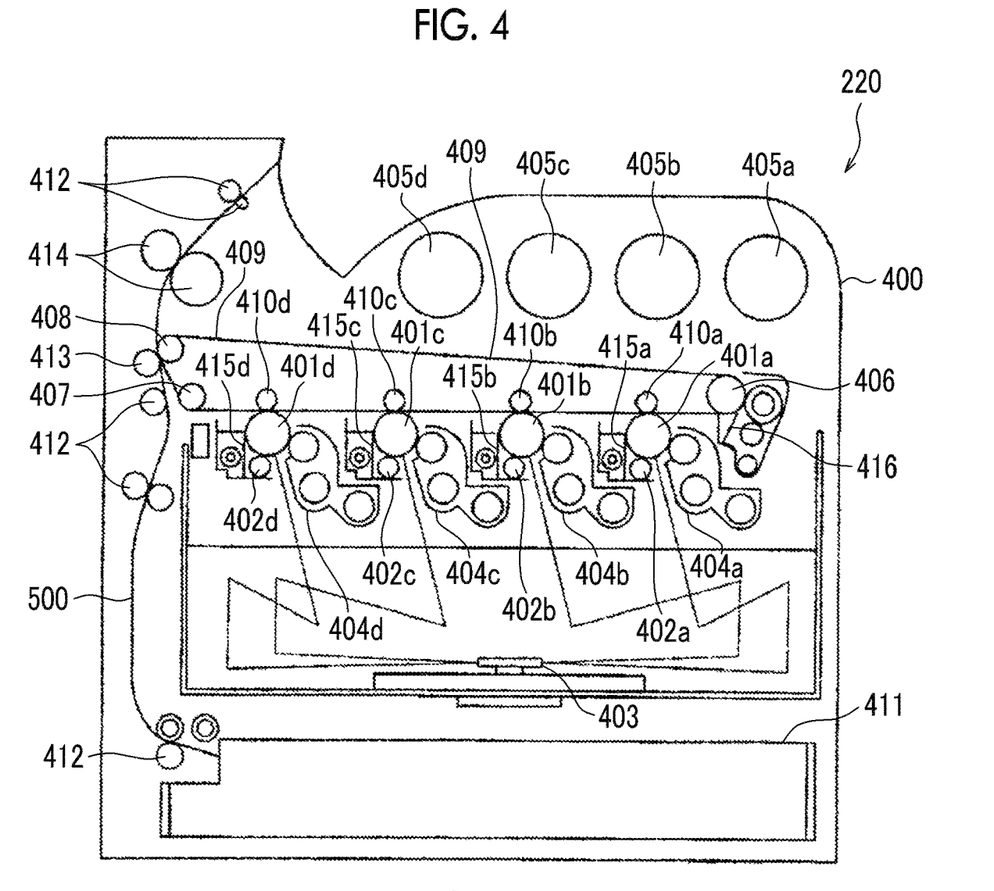
FIG. 4 is a schematic configuration diagram showing still another example of the image forming apparatus according to the present exemplary embodiment.

FIG. 4 is a schematic configuration diagram showing still another example of the image forming apparatus according to the present exemplary embodiment. FIG. 4 is a schematic diagram showing a tandem type or intermediate transfer type image forming apparatus in which four image forming units are arranged in parallel.

An image forming apparatus 220 includes four image forming units corresponding to toners of each color, an exposure device 403 including a laser light source, an intermediate transfer belt 409, a secondary transfer roll 413, a fixing device 414, and a cleaning device having a cleaning blade 416, in a housing 400.

Since the four image forming units have the same configuration, a configuration of the image forming unit including a photoreceptor 401a will be described as a representative of these.

A charging roll 402a, a developing device 404a, a primary transfer roll 410a, and a cleaning blade 415a are disposed around the photoreceptor 401a in order of rotation direction of the photoreceptor 401a. The primary transfer roll 410a presses against the photoreceptor 401a via the intermediate transfer belt 409. The toner accommodated in the toner cartridge 405a is supplied to the developing device 404a.

The charging roll 402a is a contact charging type charging device that contacts the surface of the photoreceptor 401a to charge the surface of the photoreceptor 401a. Only the direct current voltage, only the alternating current voltage, or a voltage obtained by superimposing the alternating current voltage on the direct current voltage is applied to the charging roll 402a from the power supply (not shown). In addition, the surface of the charging roll 402a is cleaned by a charging roll cleaning member (not shown).

The intermediate transfer belt 409 is stretched by a drive roll 406, a tension roll 407, and a back roll 408, and travels by rotation of these rolls.

The secondary transfer roll 413 is disposed so as to press against the back roll 408 via the intermediate transfer belt 409.

The fixing device 414 is, for example, a heating fixing device including a heating roll and a pressure roll.

The cleaning blade 416 is a member that removes a toner remaining on the intermediate transfer belt 409. The cleaning blade 416 is disposed on a downstream side of the back roll 408 and removes the toner remaining on the intermediate transfer belt 409 after transfer.

A tray 411 that accommodates the recording medium 500 is provided in the housing 400. The recording medium 500 in the tray 411 is conveyed to a contact portion between the intermediate transfer belt 409 and the secondary transfer roll 413 by a conveying roll 412, and further conveyed to the fixing device 414 to form an image on the recording medium 500. The recording medium 500 after image formation is discharged to an outside of the housing 400.

Figure 5:
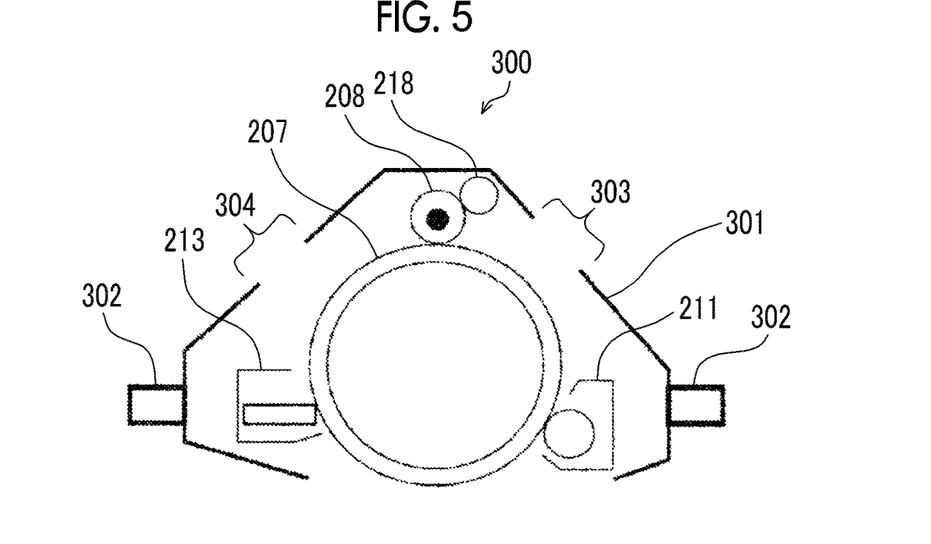
FIG. 5 is a schematic configuration diagram showing an example of a process cartridge according to the present exemplary embodiment.

FIG. 5 is a schematic diagram showing an example of a process cartridge according to the present exemplary embodiment. A process cartridge 300 shown in FIG. 5 is attached to and detached from, for example, an image forming apparatus main body including an exposure device, a transfer device, and a fixing device.

In the process cartridge 300, the photoreceptor 207, the charging member 208, the charging member cleaning member 218, the developing device 211, and the cleaning device 213 are integrated by the housing 301. The housing 301 is provided with a mounting rail 302 for attachment and detachment to and from an image forming apparatus, an opening 303 for exposure, and an opening 304 for a static elimination exposure.

The charging member 208 of the process cartridge 300 is a contact charging type charging member that is consisting of made of a roll-shaped charging member and in contact with the surface of the photoreceptor 207 to charge the surface of the photoreceptor 207. In a case where the process cartridge 300 is mounted on an image forming apparatus to perform an image formation, only direct current voltage, only alternating current voltage, or a voltage obtained by superimposing the alternating current voltage on the direct current voltage is applied to the charging member 208 from a power supply (not shown).

Developer and Toner

The developer applied to the image forming apparatus according to the present exemplary embodiment is not particularly limited. The developer may be a one-component developer containing only toner, or a two-component developer in which a toner and a carrier are mixed.

The toner contained in the developer is not particularly limited. The toner includes, for example, a binder resin, a colorant, and a mold release agent. Examples of the toner binder resin include polyester resin and styrene-acrylic resin.

The toner may be externally supplemented with an external additive. Examples of a toner external additive include inorganic particles such as silica, titania, and alumina.

Toner is prepared by producing toner particles and externally supplementing the toner particles with an external additive. Examples of a method for producing the toner particles include a kneading and pulverizing method, an agglomeration and coalescence method, a suspension polymerization method, and a dissolution and suspension method. The toner particles may be toner particles having a single layer structure, or may be toner particles having a so-called core-shell structure configured of a core portion (core particles) and a coating layer (shell layer) with which the core portion is coated.

A volume average particle diameter (D50v) of the toner particles is, for example, preferably 2 µm or more and 10 µm or less, and more preferably 4 µm or more and 8 µm or The carrier contained in the two-component developer is not particularly limited. Examples of the carrier include a coating carrier in which a surface of the core material formed of a magnetic powder is coated with a resin; a magnetic powder dispersion type carrier in which magnetic powder is dispersed and blended in a matrix resin; a resin impregnated carrier in which a porous magnetic powder is impregnated with a resin.

A mixing ratio (mass ratio) of the toner and the carrier in the two-component developer is, for example, preferably toner:carrier=1:100 to 30:100, and more preferably 3:100 to 20:100.

EXAMPLES

Hereinafter, exemplary embodiments of the invention will be described in detail with reference to Examples, but the exemplary embodiments of the invention are not limited to these Examples. In the following description, "part" is based on mass unless otherwise specified.

Example 1

Preparation of Charging Member
Preparation of Conductive Base Material

A base material made of SUM23L (JIS G 4804:2008) is plated with electroless nickel having a thickness of 5 µm, and then hexavalent chromic acid is applied to obtain a conductive base material having a diameter of 8 mm.

Formation of Adhesive Layer

Next, the following mixture is mixed with a ball mill for 1 hour, and then an adhesive layer having a film thickness of 10 µm is formed on a surface of the conductive base material by brush coating.

Chlorinated polypropylene resin (maleic anhydride chlorinated polypropylene resin, SUPERCHLON 930, manufactured by Nippon Paper Chemicals Co., Ltd.): 100 parts Epoxy resin (EP4000, manufactured by ADEKA CORPORATION): 10 parts Conductive agent (Carbon Black, KetjenBlack EC, KetjenBlack International): 2.5 parts Toluene or xylene is used for viscosity adjustment.

Formation of Elastic Layer

Epichlorohydrin-ethylene oxide-allyl glycidyl ether copolymer rubber (EPION301, manufactured by Osaka Soda Co., Ltd., ethylene oxide component content 59% by mass): 100 parts by mass Carbon black (3030B, manufactured by Mitsubishi Chemical Corporation, arithmetic average particle diameter 55 nm): 1 part by mass Calcium carbonate (Viscoexcel30, manufactured by Shiraishi Calcium Co., Ltd.): 20 parts by mass Ionic conductive agent (BTEAC, manufactured by Lion Corporation): 1.8 parts by mass Vulcanization accelerator (cross-linking accelerator): stearic acid (manufactured by NOF CORPORATION): 1 part by mass Vulcanizing agent (cross-linking agent): Sulfur (VULNOC R, manufactured by Ouchi Shinko Kagaku Kogyo Co., Ltd.): 1 part by mass Vulcanization accelerator (cross-linking accelerator): Zinc oxide: 1.5 parts by mass The mixture having the composition shown above is kneaded using a tangential pressure kneader and passes through a strainer to prepare a rubber composition. The obtained rubber composition is kneaded with an open roll to form a roll having a diameter of 12 mm on the surface of the prepared conductive base material using an extrusion molding machine via an adhesive layer, and then heated at 165° C. for 70 minutes to obtain a roll-shaped elastic layer. A thickness of the obtained elastic layer is 2 mm, and a volume resistivity is $4 \times 10^6$ Ωcm.

Formation of Surface Layer

Binder resin: N-methoxymethylated nylon 1 (trade name: Fine Resin FR101, manufactured by Namariichi Co., Ltd): 100 parts by mass Conductive agent: Carbon black (volume average particle diameter: 43 nm, trade name: MONAHRCH1000, manufactured by Cabot Corporation): 10 parts by mass Particles for forming unevenness: Polyamide particles (volume average particle diameter 5 µm, trade name: ORGASOL 2001 UD NAT1, manufactured by Arkema): 20 parts by mass A mixture having the above composition is diluted with methanol and dispersed in a bead mill under the following conditions.

Bead material: Glass
Bead diameter: 1.3 mm
Propeller rotation speed: 2,000 rpm
Dispersion time: 60 minutes The dispersion obtained above is applied to the surface of the elastic layer by a dipping method and then heat-dried at 150° C. for 30 minutes to form a surface layer having a film thickness of 10 µm to obtain a charging roll of Example 1.

Example 2

A charging roll of Example 2 is obtained in the same manner as in Example 1 except that the following changes are made.

In the formation of the elastic layer, a blending amount of carbon black is set to 3 parts by mass, a blending amount of calcium carbonate is set to 30 parts by mass, and a kind and a blending amount of an ionic conductive agent are changed to an ionic conductive agent (LX-N30N, manufactured by Osaka Soda Co., Ltd.) and 1.8 parts by mass.

In the formation of the surface layer, the blending amount of the carbon black is changed to 15 parts by mass.

Example 3

A charging roll of Example 3 is obtained in the same manner as in Example 1 except that the following changes are made.

In the formation of the elastic layer, a blending amount of carbon black is set to 3 parts by mass, a blending amount of calcium carbonate is set to 30 parts by mass, and a blending amount of the ionic conductive agent is changed to 1.6 parts by mass.

In the formation of the surface layer, the blending amount of the carbon black is changed to 13 parts by mass.

Example 4

A charging roll of Example 4 is obtained in the same manner as in Example 1 except that the following changes are made.

In the formation of the elastic layer, a blending amount of carbon black is set to 3 parts by mass, a blending amount of calcium carbonate is set to 30 parts by mass, and a blending amount of the ionic conductive agent is changed to 1.4 parts by mass.

In the formation of the surface layer, the blending amount of carbon black is changed to 5 parts by mass, and the blending amount of polyamide particles is changed to 25 parts by mass.

Example 5

A charging roll of Example 5 is obtained in the same manner as in Example 1 except that the following changes are made.

In the formation of the elastic layer, a blending amount of carbon black is set to 3 parts by mass, a blending amount of calcium carbonate is set to 30 parts by mass, and a blending amount of the ionic conductive agent is changed to 1.4 parts by mass.

In the formation of the surface layer, the blending amount of carbon black is changed to 19 parts by mass, and the blending amount of polyamide particles is changed to 15 parts by mass.

Example 6

A charging roll of Example 6 is obtained in the same manner as in Example 1 except that the following changes are made.

In the formation of the elastic layer, a blending amount of carbon black is set to 3 parts by mass, a blending amount of calcium carbonate is set to 30 parts by mass, and a blending amount of the ionic conductive agent is changed to 1.4 parts by mass.

In the formation of the surface layer, the blending amount of carbon black is changed to 19 parts by mass, and the blending amount of polyamide particles is changed to 10 parts by mass.

Example 7

A charging roll of Example 7 is obtained in the same manner as in Example 1 except that the following changes are made.

In the formation of the elastic layer, a blending amount of carbon black is set to 3 parts by mass, a blending amount of calcium carbonate is set to 30 parts by mass, and a blending amount of the ionic conductive agent is changed to 1.4 parts by mass.

In the formation of the surface layer, the blending amount of carbon black is changed to 19 parts by mass, and the blending amount of polyamide particles is changed to 40 parts by mass.

Comparative Example 1

A charging roll of Comparative Example 1 is obtained in the same manner as in Example 1 except that the following changes are made.

In the formation of the elastic layer, as an elastic material, 50 parts by mass of epichlorohydrin-ethylene oxide-allyl glycidyl ether copolymer rubber (EPION301) and 50 parts by mass of epichlorohydrin-ethylene oxide-allyl glycidyl ether copolymer rubber (CG102, manufactured by Osaka Soda Co., Ltd., ethylene oxide component content 37% by mass) are mixed and used, a blending amount of carbon black is 3 parts by mass, a blending amount of calcium carbonate is 30 parts by mass, and a blending amount of the ionic conductive agent is changed to 1.4 parts by mass.

In the formation of the surface layer, the blending amount of carbon black is changed to 13 parts by mass, and the blending amount of polyamide particles is changed to 10 parts by mass.

Comparative Example 2

A charging roll of Comparative Example 2 is obtained in the same manner as in Example 1 except that the following changes are made.

In the formation of the elastic layer, the blending amount of carbon black is set to 6 parts by mass, and the blending amount of calcium carbonate is changed to 40 parts by mass.

In the formation of the surface layer, the blending amount of carbon black is changed to 18 parts by mass, and the blending amount of polyamide particles is changed to 10 parts by mass.

Measurement

Table 1 shows the values of a resistance component Ra, a storage elastic modulus G, a time constant Tc, a resistance value Rd, a ratio Rd/Ra, a ten-point average roughness Rz ("Average roughness Rz" in the tables), an average spacing Sm ("Average spacing Sm" in the tables), and a ratio Sm/Rz of unevenness in the obtained charging roll, which are obtained by the above-mentioned methods.

Evaluation

Wear of Electrophotographic Photoreceptor

The charging rolls produced in Examples and Comparative Examples are set in DocuCentre V C7776 manufactured by Fuji Xerox Co., Ltd., which is an image forming apparatus, and paper feeding traveling of 100,000 sheets of A4 size J paper (manufactured by Fuji Xerox Co., Ltd.) is performed. As the electrophotographic photoreceptor, a photoreceptor having an organic compound layer as the outermost layer is used. Further, a superimposed voltage in which a direct current voltage and an alternating current voltage are superimposed is applied to the charging roll, and the paper feeding traveling is performed. An initial film thickness of the electrophotographic photoreceptor (that is, a film thickness before paper feeding traveling) and a film thickness after traveling (that is, the film thickness after traveling 100,000 sheets of paper) are measured. Then, the reduced film thickness (unit: μm) is calculated. Results are shown in Table 2.

Color Spots

Two DocuCentre V C7776s are prepared as the image forming apparatus, and a carbon fiber is added to one developing machine to form 20 halftone images. The photoreceptor pierced by the carbon fiber is extracted by image formation, and the photoreceptor pierced by the carbon fiber and the charging rolls of Examples and Comparative Examples are set in another image forming apparatus, and a halftone image having an image density of 30% is formed on A4 size J paper (manufactured by Fuji Xerox Co., Ltd.), and the number of color spots having a size of φ0.5 mm or more is counted. Results are shown in Table 2.

Contamination of Charging Member

An image forming apparatus ("DocuCentre-VI C7771" manufactured by Fuji Xerox Co., Ltd.) provided with a charging roll and a roll-shaped charging roll cleaning member of Examples and Comparative Examples is used as an evaluation device, and a halftone images is formed on 100,000 sheets of A4 size J paper (manufactured by Fuji Xerox Co., Ltd.). Moreover, the obtained 100,000th image is observed and evaluated according to the following evaluation criteria. Results are shown in Table 2.

G1: Occurrence of slight color streaks or white streaks that can be visually recognized in a case of looking closely G2: Occurrence of acceptable color streaks or white streaks G3: Occurrence of unacceptable color streaks or white streaks

TABLE 1

|  | Resistance component Ra (Ω) | Storage elastic modulus G (MPa) | Time constant Tc (sec) | Resistance value Rd (Ω) | Ratio Rd/Ra | Average roughness Rz (μm) | Average spacing Sm (μm) | Ratio Sm/Rz |
|---|---|---|---|---|---|---|---|---|
| Example 1 | $4.0 \times 10^4$ | 3.0 | $2.8 \times 10^{-6}$ | $9.0 \times 10^6$ | 225 | 6.4 | 152 | 23.8 |
| Example 2 | $4.0 \times 10^4$ | 5.0 | $2.8 \times 10^{-6}$ | $4.0 \times 10^6$ | 100 | 6.2 | 158 | 25.5 |
| Example 3 | $6.0 \times 10^4$ | 5.0 | $4.9 \times 10^{-6}$ | $9.1 \times 10^6$ | 152 | 6.7 | 148 | 22.1 |
| Example 4 | $6.3 \times 10^4$ | 5.0 | $5.2 \times 10^{-6}$ | $3.0 \times 10^7$ | 476 | 7.9 | 120 | 15.2 |
| Example 5 | $6.3 \times 10^4$ | 5.0 | $5.2 \times 10^{-6}$ | $3.5 \times 10^6$ | 63 | 5.3 | 183 | 34.5 |
| Example 6 | $6.3 \times 10^4$ | 5.0 | $5.2 \times 10^{-6}$ | $3.5 \times 10^6$ | 63 | 4.4 | 213 | 48.4 |
| Example 7 | $6.3 \times 10^4$ | 5.0 | $5.2 \times 10^{-6}$ | $3.5 \times 10^6$ | 63 | 9.1 | 98 | 10.8 |
| Comparative Example 1 | $6.9 \times 10^4$ | 5.0 | $5.9 \times 10^{-6}$ | $1.1 \times 10^7$ | 159 | 4.2 | 189 | 45.0 |
| Comparative Example 2 | $6.3 \times 10^4$ | 6.0 | $5.2 \times 10^{-6}$ | $4.0 \times 10^6$ | 63 | 3.8 | 199 | 52.4 |

TABLE 2

|  | Wear (μm/100 kcyc) | Color spot (spots) | Contamination of charging member (Grade) |
|---|---|---|---|
| Example 1 | 1.82 | 2 | G2 |
| Example 2 | 1.91 | 4 | G2 |
| Example 3 | 2.03 | 3 | G2 |
| Example 4 | 2.12 | 2 | G2 |
| Example 5 | 2.11 | 37 | G2 |
| Example 6 | 2.10 | 38 | G3 |
| Example 7 | 2.19 | 36 | G3 |
| Comparative Example 1 | 2.36 | 2 | G3 |
| Comparative Example 2 | 2.34 | 4 | G3 |

From the above results, it can be seen that in the charging member of present example, wear of the electrophotographic photoreceptor is suppressed, compared to the charging member of comparative examples.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A charging member comprising:
    a conductive base material;
    an elastic layer that is provided on the conductive base material and has a storage elastic modulus G of 5.0 MPa or less at 100 Hz; and
    a surface layer that is provided on the elastic layer,
    wherein, in a Cole-Cole plot obtained by measuring the charging member in a range of 1 MHz to 0.1 Hz by an alternating current impedance method, a resistance component Ra of a capacitive semicircle including 2.5 kHz is $6.3 \times 10^4 \Omega$ or less.

2. The charging member according to claim 1,
    wherein a time constant Tc of the capacitive semicircle including 2.5 kHz is $5.0 \times 10^{-6}$ sec or less.

3. The charging member according to claim 1,
    wherein a resistance value Rd obtained by measuring the charging member by a direct current method is $4.0 \times 10^6 \Omega$ or more and $3.0 \times 10^7 \Omega$ or less.

4. The charging member according to claim 3,
wherein a ratio Rd/Ra of the resistance value Rd obtained by measuring the charging member by the direct current method to the resistance component Ra is 63 or more.

5. The charging member according to claim 1,
wherein a ten-point average roughness Rz on an outer peripheral surface of the charging member is 8 μm or less.

6. The charging member according to claim 5,
wherein a ratio Sm/Rz of an average spacing Sm of unevenness on the outer peripheral surface of the charging member to the ten-point average roughness Rz is 15 or more and 35 or less.

7. The charging member according to claim 6,
wherein the ten-point average roughness Rz is 2 μm or more, and
the average spacing Sm of the unevenness on the outer peripheral surface of the charging member is 50 μm or more and 250 μm or less.

8. The charging member according to claim 1,
wherein the resistance component Ra is $4.0 \times 10^4 \Omega$ or less.

9. The charging member according to claim 1,
wherein the storage elastic modulus G is 3.0 MPa or less.

10. The charging member according to claim 1,
wherein the elastic layer contains
 an elastic material containing an epichlorohydrin-alkylene oxide copolymer rubber,
 carbon black, and
 an inorganic filler.

11. The charging member according to claim 10,
wherein a content of the carbon black is 3 parts by mass or less with respect to 100 parts by mass of the elastic material.

12. The charging member according to claim 10,
wherein a content of the inorganic filler is 30 parts by mass or less with respect to 100 parts by mass of the elastic material.

13. The charging member according to claim 10,
wherein a content of a structural unit derived from an alkylene oxide with respect to an entirety of the epichlorohydrin-alkylene oxide copolymer rubber is 55% by mass or more.

14. The charging member according to claim 10,
wherein the elastic layer further contains an ionic conductive agent.

15. A charging device comprising:
the charging member according to claim 1,
wherein the charging device charges a surface of an electrophotographic photoreceptor by a contact charging method.

16. The charging device according to claim 15, further comprising:
an application unit that applies a superimposed voltage, in which a direct current voltage is superimposed on an alternating current voltage, to the charging member.

17. The charging device according to claim 15, further comprising:
a charging member cleaning member that cleans an outer peripheral surface of the charging member.

18. A process cartridge comprising:
an electrophotographic photoreceptor; and
the charging device according to claim 15, that charges a surface of the electrophotographic photoreceptor,
wherein the process cartridge is attached to and detached from an image forming apparatus.

19. An image forming apparatus comprising:
an electrophotographic photoreceptor;
the charging device according to claim 15, that charges a surface of the electrophotographic photoreceptor;
an electrostatic latent image forming unit that forms an electrostatic latent image on the charged surface of the electrophotographic photoreceptor;
a developing unit that develops the electrostatic latent image formed on the surface of the electrophotographic photoreceptor by a developer containing a toner to form a toner image; and
a transfer unit that transfers the toner image to a surface of a recording medium.

20. The image forming apparatus according to claim 19,
wherein the electrophotographic photoreceptor has an organic compound layer as an outermost layer.

* * * * *